Aug. 22, 1950     J. O. STEVENS ET AL     2,519,714
BROOM RAKE HANDLE ATTACHMENT
Filed June 17, 1948     2 Sheets-Sheet 1

INVENTORS,
FRANCIS F. MELVIN AND
JOE O. STEVENS,
By Hubert A. Munturn
ATTORNEY.

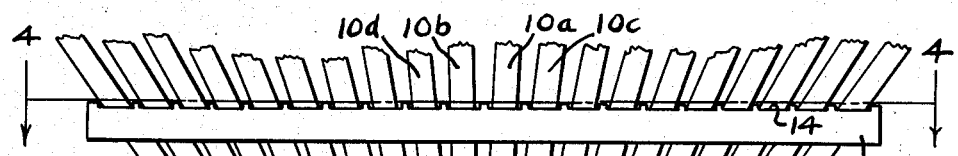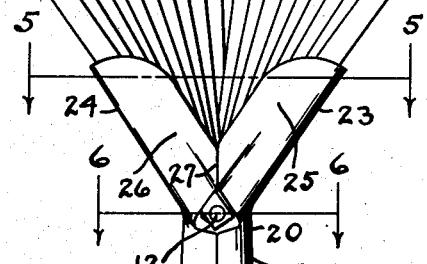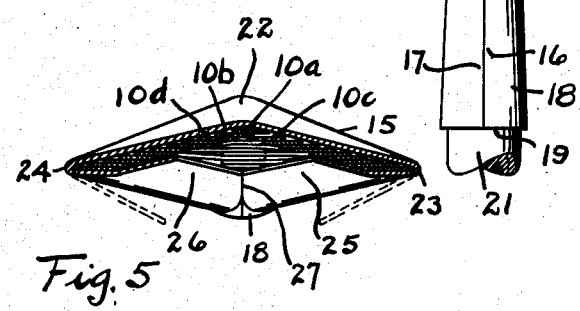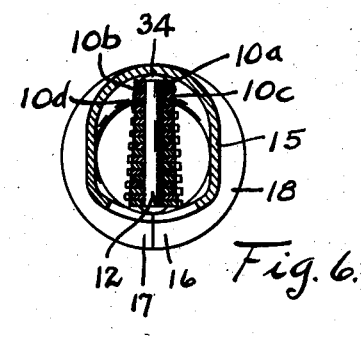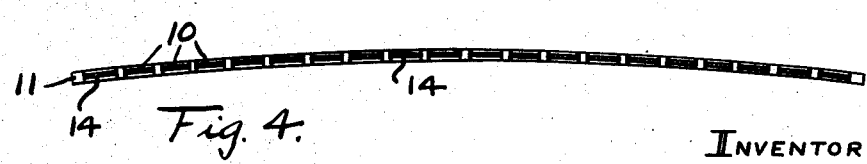

Patented Aug. 22, 1950

2,519,714

UNITED STATES PATENT OFFICE 2,519,714

BROOM RAKE HANDLE ATTACHMENT

Joe O. Stevens and Francis F. Melvin, Elwood, Ind., assignors, by mesne assignments, to Henry Disston & Sons, Inc., Philadelphia, Pa., a corporation of Pennsylvania Application June 17, 1948, Serial No. 33,536

6 Claims. (Cl. 56—400.17)

This invention relates generally to the so-called broom rake wherein there are a plurality of flexible fingers flaring outwardly by outer ends from a zone of juncture adjacent a handle end. The invention relates primarily to means of securing a handle ferrule to the fingers in a secure and yet easily formed construction which will be permanent in nature and durable throughout the life of the fingers themselves.

Figure 1:
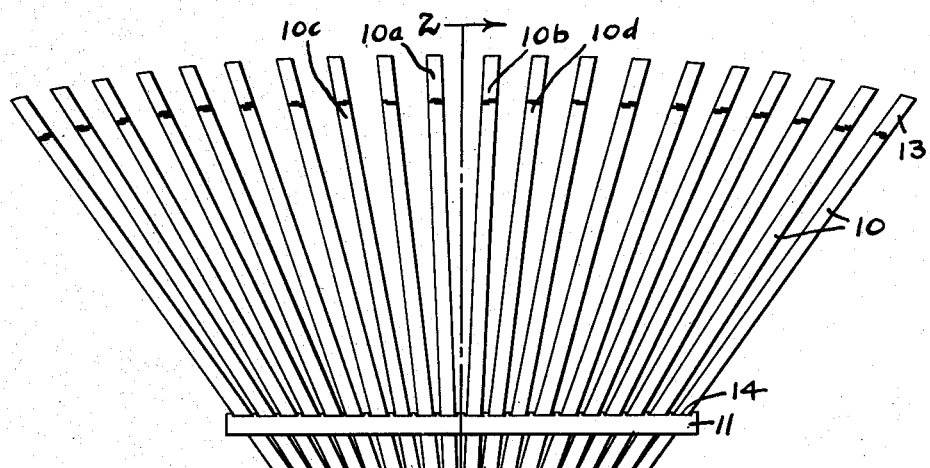
Figure 2:
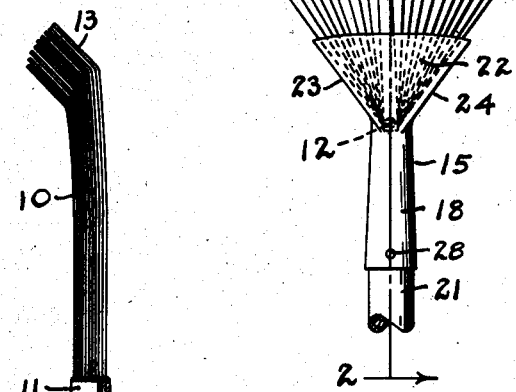

By reason of the construction forming the invention, the member interconnecting the handle ferrule with the fingers themselves may be made out of a single piece of metal which may be secured to the fingers simply by bending portions thereof into a substantially concave zone produced by the peculiar method of interconnecting the upper ends of those fingers. Many other objects and advantages of the invention will become apparent to those versed in the art in the following description of one particular form of the invention as illustrated in the accompanying drawings, in which Fig. 1 is a view in top plan of a structure embodying the invention;

Fig. 2, a longitudinal, central section on the line 2—2 in Fig. 1;

Fig. 3, a bottom plan view of the structure on a slightly enlarged scale;

Fig. 4, a transverse section on the line 4—4 in Fig. 3;

Fig. 5, a transverse section on the line 5—5 in Fig. 3; and

Fig. 6, a transverse section on the line 6—6 in Fig. 3.

Referring to the drawings, in which like characters of reference indicate like parts throughout the several views therein, a plurality of flat steel bar fingers 10, herein shown as twenty in number, are carried through a spreader bar 11 and continued therebeyond by rear or upper ends to be interconnected by a pin or rivet 12. Each of these fingers 10 is spring like in nature and preferably have a down-turn free end 13. The spreader bar 11 consists essentially of a U-shaped channel through which are slots 14, one slot to receive each finger 10 therethrough. These slots 14 are formed in the bend of the channel 11, and then after the fingers 10 are secured one to the other by the pin 12, this spreader bar 11 is fixed in position by any suitable means such as by spot welding to the individual fingers.

Each of the fingers 10 is perforated at its rear end to receive the pin 12 therethrough. Beginning with one finger 10a, its upper end is slipped over the pin 12 to abut the pin head 34; then the finger 10b diverging from finger 10a is slipped by its upper end over the pin 12; following which fingers 10c and 10d are likewise engaged by their ends over the pin 12; and so on until all of the finger ends are mounted by those rear ends on the pin 12. Each of the fingers diverging to one side of the longitudinal center line are overlapped by their rear ends in alternating manner with the rear ends of those fingers diverging to the other side of the longitudinal center line. Then the other end of the pin 12, the under end of the pin in the present showing, is riveted over so as to secure all of those ends in position in that overlapping relationship on the pin 12. By arranging these fingers 10 along the pin 12, there is formed therebetween immediately ahead of the pin 12 a V-like cavity, Fig. 5, diverging outwardly from that juncture zone with the pin 12 and gradually tending to flatten out into the concave shape of the contour maintained by the tie bar 11, Fig. 4.

A piece of sheet metal generally designated by the numeral 15 is formed to have its longitudinal ends 16 and 17 brought around into abutment to form a handle receiving ferrule 18. Preferably the internal shape of this ferrule 18 is made to taper from a large diameter at the end 19 to a smaller diameter at the forward or lower end 20 so that the handle 21 needs to be tapered somewhat to enter the ferrule 18 with a frictional grip therein.

From the lower end of this ferrule 18, the metal is flared outwardly into a more or less triangular shaped cap 22, Fig. 1, to have a shape to conform to the configuration of the fingers 10 at their rear ends as they approach and are secured to the pin 12. From the lateral sides of this portion 22, the metal is bent along the lines 23 and 24 following the slopes of the outermost fingers 10 to be carried around and under those fingers by flaps 25 and 26. These flaps 25 and 26 are then pressed upwardly into the cavity which has above been defined as a V-like cavity, Figs. 2 and 5. The flaps 25 and 26 are pressed firmly upwardly against the undersides of the diverging fingers in the manner illustrated, and preferably portions of these flaps abut one another along a line 27 to insure further rigidity of the construction. These flaps 25 and 26 are integral parts of the overlying member 22 and are folded therefrom around through the bends 23 and 24.

As these flaps 25 and 26 are forced upwardly against the various fingers 10, the upper portion 22 is drawn down snugly against the top sides of those fingers, whereby the fingers adjacent the pin 12 are securely and forcibly gripped one against the other and held in compressive engagement. By reason of that cavity, above indicated as appearing between the ends of the fingers 10 adjacent the pin 12, the flaps 25 and 26 extend therein sufficiently so as to prevent the entire metallic member 15 including the ferrule 18 from movement in any direction, and primarily in a movement longitudinally away from the fingers 10. Furthermore by reason of the angularity of the fingers 10, the metallic member can not move forwardly or downwardly along those fingers without becoming more tightly wedged into engagement therewith. As indicated in Fig. 5, these flaps 25 and 26 are originally formed in some such positions as indicated by the dash lines and are then pressed into their final positions of finger engagement. The handle 21 is further secured within the ferrule 18 in the usual manner by some such means as a screw or nail, herein shown as by a nail 28, Fig. 2.

While we have herein shown and described our invention in the one particular form, it is obvious that structural changes may be employed without departing from the spirit of the invention, and we therefore do not desire to be limited to that precise form beyond the limitations which may be imposed by the following claims.

We claim:

1. In a broom rake, a plurality of diverging fingers, a pin passing through the rear ends of said fingers, said rear ends being overlapped along said pin with the fingers diverging alternately to opposite sides of a radial center line so as to form a V-like cavity at one side of the finger assembly adjacent said pin, a handle ferrule, a plate extending from said ferrule over the fingers adjacent said pin and on the opposite side of the assembly from said cavity, and a flap at each side of said plate folded around the outermost of said fingers at the proximate edge of said assembly and into said cavity so as to interlock the ferrule with the assembly.

2. A broom rake according to claim 1 wherein the said plate and flaps are in clamping engagement with the fingers in the overlap area.

3. In a broom rake, a plurality of diverging fingers, a pin passing through the rear ends of said fingers, said rear ends being overlapped along said pin with the fingers diverging alternately to opposite sides of a radial center line so as to form a V-like cavity at one face of the finger assembly adjacent said pin, a handle ferrule, a plate extending from said ferrule over and in contact with said fingers adjacent said pin and on the opposite face of the assembly from said cavity, and a flap at each side of said plate folded around the outermost of said fingers at the proximate edge of said assembly and into said cavity so as to interlock the plate and ferrule to the assembly, and a finger spacer bar fixed to and retaining said fingers in a predetermined fan-shaped pattern.

4. In a broom rake, a plurality of outwardly fanning fingers having end portions stacked one upon another in predetermined order starting from the centrally disposed fingers of the fanlike assembly and progressing in both lateral directions toward the fingers at each of the respective outer edges so as to form an outwardly flaring V-shaped cavity in one face of the fanlike assembly adjacent said end portions, means for maintaining the said end portions in the stacked relation, a plate extending across the said end portions at the opposite face of the assembly from said cavity, a flap extending from each side edge of said plate around the outer fingers and thence into the cavity and over the fingers on that face of the assembly so as to interlock the plate with the assembly, and a handle ferrule extending from said plate.

5. A broom rake according to claim 4 wherein the fingers are rigidly clamped between the plate and the flaps.

6. A broom rake according to claim 4 wherein the said plate and interlocking flaps constitute the sole means for securing the ferrule to the fingers.

JOE O. STEVENS.
FRANCIS F. MELVIN.

REFERENCES CITED

The following references are of record in the file of this patent:

UNITED STATES PATENTS

| Number | Name | Date |
| --- | --- | --- |
| 1,499,086 | Tsuchiya | June 24, 1924 |
| 2,072,992 | Potemkin | Mar. 9, 1937 |
| 2,122,359 | Sage | June 28, 1938 |
| 2,149,429 | Finkes | Mar. 7, 1939 |
| 2,210,784 | Tokunaga | Aug. 6, 1940 |